Jan. 17, 1967   R. D. LURIE   3,298,559
CONTAINERS COLD-FORMED FROM PLASTIC AND METAL LAMINATE
Filed Oct. 8, 1963
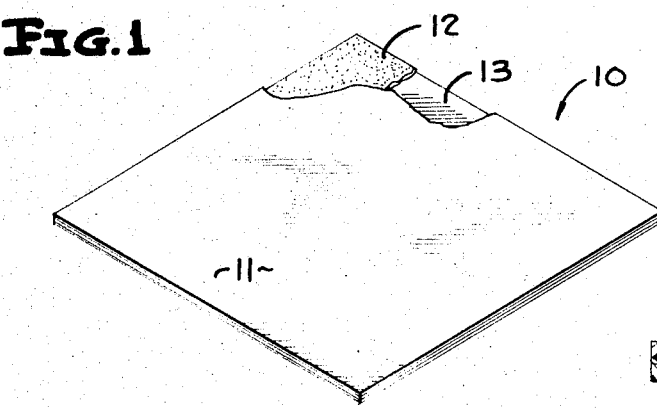
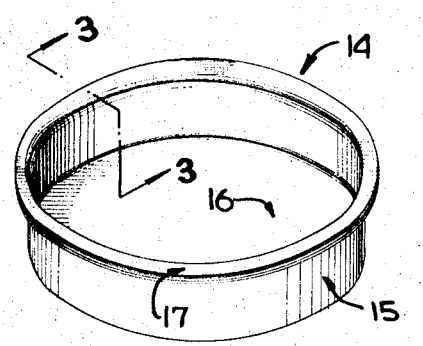
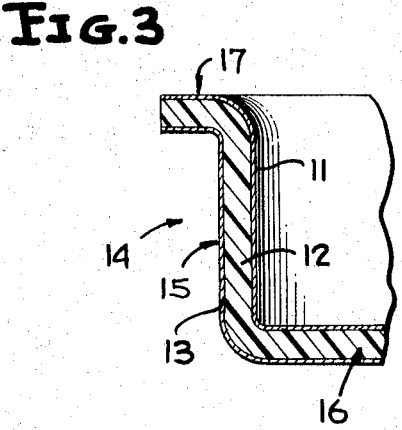
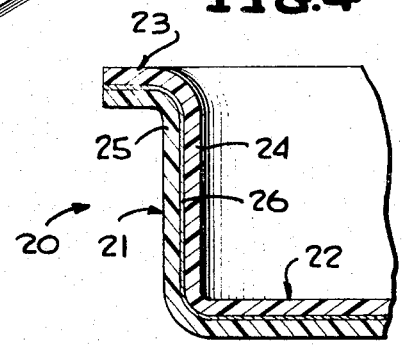
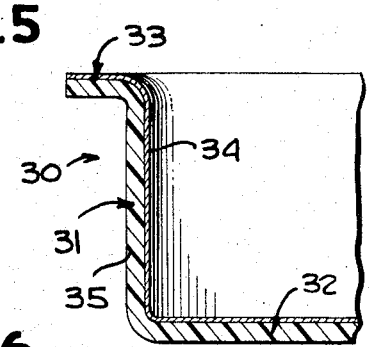
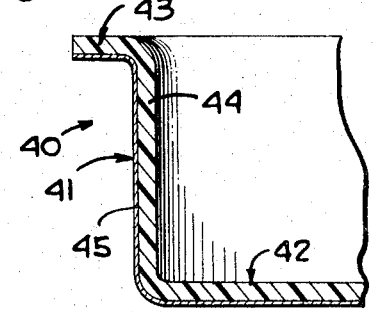
INVENTOR
RANDOLPH D. LURIE
BY
*Mason, Porter, Diller & Stewart*
ATTORNEYS United States Patent Office 3,298,559
Patented Jan. 17, 1967

3,298,559
CONTAINERS COLD-FORMED FROM PLASTIC AND METAL LAMINATE
Randolph D. Lurie, Park Forest, Ill., assignor to Continental Can Company, Inc., New York, N.Y., a corporation of New York
Filed Oct. 8, 1963, Ser. No. 314,658
8 Claims. (Cl. 220—63)

This invention relates to novel containers cold-formed from plastic-metal laminates, and in particular, to novel light weight, low-cost, plastic-metal laminate containers which are substantially impermeable to light, liquids and gases, offer excellent resistance to chemical attack, are dimensionally stable for a wide range of temperatures and exhibit exceptional high-strength qualities.

It is conventional in the container manufacturing industry to fabricate containers, such as wide-mouth bottles, trays and cups, from plastic material by extruding, molding or otherwise forming a melted polymer mass or heated polymer sheets. These conventional plastic containers are generally satisfactory for most purposes, however, such plastic containers usually possess one or more undesirable properties such as brittleness at low temperature, susceptibility to chemical attack, permeability to gasses or vapors, etc.

On the other hand, the container manufacturing industry has recognized that metal containers possess many of the properties which plastic containers lack. For example, most metal containers are impermeable to gases or vapors, possess high physical strength and chemical resistance, etc., which are desirable characteristics of a container. Here again, however, there are numerous disadvantages to manufacturing containers constructed solely from metal, such as high shipping weight and a relatively high cost of raw materials.

Paper containers, on the other hand, are relatively light weight and the cost of the raw paperstock material is relatively low. However, intricate bending and folding is generally necessary to rigidify or strengthen a paper container and special processing of paper containers is necessary to increase their general permeability and chemical resistance.

Therefore, in the interest of economy, most practical containers involve a compromise in physical properties such that a particular container may be suitable for only a certain narrow range of uses depending upon whether it is manufactured from plastic, metal or paper.

For low cost single-use containers, such as beer cartons, the container manufacturing industry has generally turned to paper because of its relatively low cost, while deleterious liquid materials, as are prevalent in the chemical industries, are usually packaged in metal or plastic containers. Containers which are used repeatedly are usually constructed from metal, but both paper and plastic containers are prominently employed in this area, the selection again usually depending upon the product which is to be packaged in the containers, the expectant life of the containers and the cost of the raw materials from which the containers are constructed.

It is therefore believed apparent that an "optimum" container has not yet been developed by the container manufacturing industry which offers, for the most part, a suitable compromise for more than a very restricted range of uses. However, a very practical and economical compromise is now provided by the novel containers of this invention.

The containers of this invention particularly offer a solution to many of the aforementioned disadvantages of plastic or of metal containers by combining plastic and metal material into a single container structure which reduces or totally eliminates the disadvantages of plastic or metal containers per se.

The containers of this invention are constructed from one or more layers of plastic and metal arranged in such a manner that the plastic counteracts the disadvantages of the metal and the metal counteracts the disadvantages inherent in the plastic material. Such a container of plastic-metal laminate might have only two layers, a metal layer on the inside and a plastic layer on the outside of the container or vice versa. Other plastic-metal laminate containers are constructed to have a layer of metal sandwiched between two layers of plastic, or vice versa.

Therefore, not only is it an object of this invention to provide a novel container constructed from a plastic-metal laminate which practically eliminates the disadvantages inherent in metal or plastic containers, but also, it is a further object of this invention to take advantage of the unobvious characteristics obtained by such a plastic-metal laminate container. In particular, it is well known that plastic, such as polyethylene, will melt at temperatures within the range of approximately 230–250 degrees F. Until this time, this temperature range has precluded the use of various plastics as raw materials from the production of cooking containers, such as cake and pie baking pans, which are necessarily subjected to temperatures generally varying between 350–450 degrees F. for time periods up to and beyond sixty minutes. Within this temperature range plastic baking containers would lose their dimensional stability, melt and collapse; and within a very short time thereafter, such plastic containers would completely disintegrate.

It has been discovered, however, that a very thin layer of metal, such as aluminum foil, when laminated to a plastic sheet of material, and formed into a container body combines with the plastic material in an unobvious manner to prevent this collapsing and disintegration of the plastic when the plastic-metal container is subjected to temperatures within the above-noted 350–450° temperature range and substantialy higher. The plastic material of the plastic-metal container merely softens slightly yet withstands these unusually high temperatures. Such laminated plastic-metal containers withstand these high temperatures because the relatively thin but highly impermeable metal prevents oxygen permeation of the plastic-metal container, that is, the relatively impermeable metal prevents the transmission of gas (oxygen) through the container and though the plastic softens slightly, the dimensional stability and integrity of the container is maintained.

Another object of this invention, is therefore, to provide a novel plastic-metal laminate container which not only possesses the desirable properties of both a plastic and a metal container, but also can withstand temperatures which would otherwise completely destroy the plastic material in the absence of the metal of the plastic-metal container.

Another object of this invention is to provide a novel laminated container including a container body terminating in an integral bottom wall, the container body being formed from at least two laminated sheets of material, one of the sheets being constructed from plastic material and the other of the sheets being constructed from metallic material against which heat is adapted to be directly applied whereby the relative impermeability of the metallic material protects the plastic material from oxygen permeation and maintains the integrity and dimensional stability of the container body, while the plastic though slightly soft, also restrains the metallic material and therewith cooperatively maintaining the dimensional stability of the container.

Another object of this invention is to provide a novel laminated container of the type immediately above described wherein the plastic material is polyethylene having a thickness substantially within the range of .002 to .02 inch and the metallic material is aluminum foil having a thickness substantially within the range of .0003–.015 inch.

Another object of this invention is to provide a novel laminated container having a container body terminating in a bottom wall, the container body being formed from a pair of first sheets of material forming inner and outer walls of the container body and a second sheet forming an intermediate wall of the container body between the inner and outer walls thereof, the first sheets being formed from plastic material and the second sheet being formed from metallic material, the thickness of each of the pair of first sheets being substantially in the range of .002–.02 inch and the thickness of the second sheet lying substantially within a range of .0003–.015 inch.

Still another object of this invention is to provide a novel container constructed from plastic-metal laminate and including a container body having an integral bottom wall, the container body being formed from a first pair of sheets of metallic material sandwiching a second sheet of plastic material whereby the relative impermeability of the metallic material protects the plastic material from oxygen permeation and maintains the dimensional stability of the container, while the plastic material, though softened slightly, acts as a restraining medium to aid in maintaining the dimensional stability of the container when the container is subjected to external forces tending to deform the container.

A further object of this invention is to provide a novel laminated container such as the container described immediately above, and in addition, to form each of the pair of first sheets from aluminum foil, having a thickness substantially within the range of .0003–.015 inch and the second sheet from polyethylene having a thickness substantially within the range of .002–.02 inch.

With the above, and other objects in view that will hereinafter appear, the nature of the invention will be more clearly understood by reference to the following detailed description, the appended claims and the several views illustrated in the accompanying drawings.

In the drawings:

FIGURE 1 is a top perspective view with parts broken away for clarity, and illustrates a sheet of plastic material laminated between two sheets of metallic material.

FIGURE 2 is a top perspective view of a container formed from the laminated sheet shown in FIGURE 1 of the drawings.

FIGURE 3 is an enlarged fragmentary sectional view taken along line 3—3 of FIGURE 2 and illustrates inner and outer metallic container body walls sandwiching therebetween an intermediate plastic container body wall of the laminated container of FIGURE 2.

FIGURE 4 is a fragmentary vertical sectional view of another laminated container, and illustrates inner and outer container body walls of plastic material and an intermediate metallic container body wall.

FIGURE 5 is a fragmentary vertical sectional view of another container constructed in accordance with this invention, and illustrates a container body having an outer wall constructed from plastic material and an inner wall constructed from metallic material.

FIGURE 6 is a fragmentary vertical sectional view of another laminated container, and illustrates a container body wall having an inner plastic wall and an outer metallic wall.

A flat sheet 10 of plastic-metal laminate is illustrated in FIGURE 1 of the drawings, and includes a first metallic sheet or layer 11, an intermediate plastic sheet or layer 12, and a second metallic sheet or layer 13. The sheet of plastic-metal laminate 10 is formed in a conventional manner, as by a heat-bonding operation to thoroughly bond the metallic sheets 11 and 13 to either side of the intermediate plastic sheet 12. Each of the metallic sheets 11 and 13 is preferably constructed from aluminum foil having a thickness substantially in the range of .0003–.015 inch, but preferably in the range of .0005 to .002 inch. The intermediate sheet of plastic material 12 is preferably formed from polyethylene or polycarbonate and has a thickness substantially between the range of .002 to .02, but preferably in the range of .005–.010 inch.

The sheet of plastic-metal laminate 10 is preferably cold-drawn at room temperature in a conventional forming die to form a seamless, plastic-metal laminate container 14, as is best illustrated in FIGURES 2 and 3 of the drawing. The plastic-metal laminate container 14 comprises a substantially shallow, cylindrical body or wall 15 terminating in an integral bottom wall 16 and an upper, radially outwardly directed peripheral flange 17. The metallic sheets 11 and 13 form respective inner and outer walls of the plastic metal laminate container 14 while the intermediate sheet 12 forms an intermediate wall of the container 14. The sheet 10 of plastic-metal laminate could also be drawn in a manner whereby the first sheet 11 forms the outer wall of the container 14 and the second sheet 13 forms the inner wall of the container 14. In either case, the intermediate plastic wall 12 of the container body 15 would be sandwiched between and substantially entirely encased by the first and second metallic sheets 11 and 13 respectively.

The plastic-metal laminate container 14 is particularly adapted for use as a baking container and must therefore be capable of withstanding prolonged heating at service temperatures between approximately 350 degrees–450 degrees F. These service temperatures are well above the melting range temperatures (230–250 degrees F.) of most low density plastic materials from which the intermediate wall 12 of the container body 15 is preferably formed. It would therefore be expected that the intermediate plastic wall 12 of a container constructed in accordance with the disclosure of FIGURES 2 and 3 would melt, burn and eventually disintegrate when subjected to temperatures at and beyond substantially 230–250 degrees F. Yet when a plastic metal laminate container was formed in accordance with the above disclosure and subjected to temperatures far in excess of this latter temperature range, the intermediate plastic wall thereof did not burn or disintegrate, but remained remarkably intact. The intermediate plastic wall merely softened slightly and the inner and outer metallic walls maintained the dimensional stability of the container. Most important, however, was the fact that the relative impermeability of the inner and outer metallic walls of the container protected the plastic material of the intermediate wall from oxygen permeation or transmission and prevented the disintegration thereof. Though the plastic was soft, it formed a restraining medium lending body to the container and resisted forces, such as the weight of a batter being baked in the container, tending to deform the container outwardly. The structural integrity of such plastic-metal laminate containers remained basically unchanged when tested at temperatures which were completely detrimental to containers formed solely from the same plastic material forming the intermediate wall of the laminate containers.

A metal-plastic-metal container of the type immediately above-described, was formed from a laminate which was prepared by heat-bonding a sheet of 0.0005 inch thick aluminum foil (0 temper) to each side of a 0.005 inch thick sheet of 0.93 density polyethylene to make a 0.006 inch thick laminate sheet. This laminate sheet was then cold-formed by a drawing operation at room temperature in a conventional die of a conventional press. The resulting container was drawn to the configuration of the container 14 with the two sheets of aluminum foil forming the inner and outer walls of the container and the sheet of polyethylene forming the intermediate wall of the container.

This container was then subjected to the following treatments:

(1) Heating (while empty) for 12¼ hours in a circulating-air oven at 350 degrees F.

(2) Heating (while containing water) for ½ hour on a hot plate at a surface temperature of 450 degrees F. to over 600 degrees F.

(3) Heating (while empty) for 64¼ hours in a circulating-air oven at 465 to 470 degrees F.

During this entire heating test, there was no sign of damage to the container such as delamination or punctures. The intermediate polyethylene wall did not burn nor disintegrate and the container retained its drawn shape.

Another container was formed from a laminate prepared by heat-bonding a 0.0005 inch thick dead-soft aluminum foil sheet to both sides of a 0.008 inch thick low density polyethylene sheet. This three sheet laminate was then drawn into small round pans about three inches in diameter and ⅞ inch deep (with a flange) by means of a conventional die assembly.

Another identical laminate as that immediately above described was also used in the preparation of small rectangular pans about 5½ inches long by 4 inches wide and 1¼ inches deep.

Another laminate was prepared by heat-bonding a 0.0005 inch thick dead-soft aluminum foil sheet to both sides of a 0.009 inch thick polycarbonate sheet to form a three sheet laminate. This laminate was then drawn into small round pans about three inches in diameter and approximately ⅞ inch deep, including a flange, by a conventional die assembly.

Each of these latter three laminate containers was filled with a cake batter and inserted into a gas oven at a temperature of 375 degrees F. for approximately 25 minutes. Upon the completion of the 25-minute baking period, each of the containers was removed from the gas oven and examined. None of these containers showed signs of delamination, and despite a loss of rigidity due to softening of the plastic during the baking cycle, the containers did not lose their dimensional stability.

In each of the examples described above, it should be particularly noted that a plastic container of the same material would melt and disintegrate. However, surfaces of such a plastic container which would otherwise be directly affected by the heat of the described tests are covered, in accordance with this invention, with impermeable metal which prevents such direct heat-application to the intermediate plastic material, prevents oxygen permeation thereof and maintains the integrity of the plastic container.

Another plastic-metal laminate container constructed in accordance with this invention is shown in FIGURE 4 of the drawings, and is generally designated by the reference numeral 20. The container 20 includes a container body or wall 21 which is substantially cylindrical in shape. The container wall 21 terminates in an integral bottom wall 22 and has an outwardly directed flange 23.

The plastic-metal laminate container 20 is constructed from a three-layer laminate sheet (not shown) similar to the laminate sheet 10 of FIGURE 1. However, this laminate is prepared by heat-bonding a sheet of plastic material to each side of a sheet of metal. The laminate sheet is then drawn at room temperature in a conventional die assembly to form the plastic-metal laminate container 20. When thus drawn to form the laminate container 20, a first sheet or layer 24 of plastic material forms an inner wall of the container, a second or outer sheet 25 forms an outer wall of the container 20 and laminated between these latter two walls in an intermediate metallic wall 26.

The plastic material forming the inner and outer walls 24 and 25, respectively, of the container 20 is preferably polyethylene or polycarbonate having a thickness of approximately .005 to .01 inch. The intermediate wall 26 of the container 20 is preferably formed from a sheet of aluminum foil having a thickness substantially within the range of .0003–0.015 inch.

Another plastic-metal laminate container 30 of FIGURE 5 of the drawing was drawn at room temperature from a laminate sheet substantially identical to the laminate sheet 10 of FIGURE 1 except that the second sheet or layer 13 is omitted. The laminate container 30 comprises a substantially cylindrical container body or wall 31 having a lower integral bottom wall 32 and an upper outwardly directed peripheral flange 33. A sheet of metal, such as aluminum foil, forms an inner wall 34 of the container body 31 while a sheet of plastic material, such as polyethylene or polycarbonate, forms an outer wall 35 of the container 30.

The plastic-metal laminate container 30 is particularly adapted for use as a heating unit to be used in conjunction with a conventional chafing dish. A working embodiment of the laminate container 30 was drawn from a laminate sheet formed from polyethylene and aluminum foil. The thickness of the aluminum foil was .0015 inch and the thickness of the polyethylene was .008 inch.

This container was tested by igniting alcohol in the container 30 and allowing it to burn for 30 minutes. The plastic-metal laminate container 30 withstood the flame temperature of the alcohol (approximately 800 degrees F.) while, as has been heretofore noted, the melting range of the polyethylene is approximately 230–250 degrees F. No delamination of this container was observed and only a slight yellow discoloration of the outer polyethylene wall 35 appeared on an upper half of the container body 31. It should also be noted that during this test the heat of the burning alcohol was prevented from directly affecting the outer plastic wall 35 by the inner metallic wall 34. Thus, that portion of the plastic wall 35 which would be directly affected by the heat of the burning alcohol in the absence of the metallic wall 34, is effectively protected against oxygen permeation and the dimensional stability and integrity of the container 30 is maintained.

A plastic-metal laminate container 40 of FIGURE 6 is constructed by preparing a laminate sheet, such as the sheet of FIGURE 10, except for the omission of the first sheet or layer 11. Thereafter, the laminate sheet is drawn at room temperature to form the container 40.

The plastic-metal laminate container 40 includes a substantially shallow cylindrical container body or wall 41, a bottom wall 42 and an outwardly directed peripheral flange 43. An inner wall 44 of the laminate container 40 is formed of plastic material, such as polyethylene or polycarbonate, while an outer wall 45 is made of metal, such as a sheet of aluminum foil. The range of thickness of the sheets 44 and 45 is substantially identical to the range of thickness of the respective sheets 12 and 11 of FIGURES 1 through 3.

It will be readily apparent upon reviewing the foregoing that there has been provided relatively simple, efficient and economical plastic-metal laminate containers which are capable of withstanding service temperatures beyond those indurable by plastic containers alone. However, further advantages are obtained because of the relative inexpensive cost of the raw materials and the simplicity of the drawing operation. Since the plastic-metal laminate containers are formed at room temperature, the necessity of first heating the plastic sheet of the laminate to its softening temperature is unnecessary and the use of heaters and extra handling operations which are commonly required in the fabrication of plastic containers has been eliminated.

It is also considered within the scope of this invention to construct the laminate sheet 10 by adhesive lamination process as opposed to the heat lamination heretofore described. Any adhesive which is flexible at room temperature and which does not liberate gaseous products at the service temperatures heretofore noted could be applied to plastic and metal sheets to form a laminate. The thickness of this adhesive coating or layer should not be greater than 0.0005 inch.

The containers of FIGURES 2 through 6 of the drawing have a minimum of two sheets and a maximum of three laminated sheets. This two and three sheet construction is merely illustrative of the invention and sheets in addition to those disclosed may be heat or adhesive laminated to form a variety other other plastic-metal laminate containers.

From the foregoing, it will be seen that novel and advantageous provision has been made for carrying out the desired end. However, attention is again directed to the fact that variations may be made in the example plastic-metal laminate containers disclosed herein without departing from the spirit and scope of this invention as defined in the appended claims.

I claim:

1. In a laminated container of the type including a container body terminating in an integral bottom wall, said container body being formed from at least two laminated sheets of material, said container body being of a definite and stable shape and volume at room temperature and atmospheric pressure, a first of said sheets being adapted for the direct application of heat against a surface thereof and a second of said sheets being adapted to prevent the direct application of heat to the surface of the first of said sheets; the improvement comprising: constructing said first sheet from polymeric plastic material and said second sheet from relatively impermeable metallic material whereby the second sheet prevents the direct application of heat against a surface of the plastic material and a relative impermeability of the second sheet prevents oxygen permeation of the plastic material at temperatures in excess of the melting-temperature range of said plastic material, the plastic material having a predetermined melting-temperature range, said laminated container body maintaining its integrity and dimensional stability at temperatures substantially in excess of the melting-temperature range of the plastic material, the thickness of the first sheet is between the range of .002 to .02 inch and the thickness of the second sheet is between the range of .0003–.015 inch.

2. In a laminated container of the type including a container body terminating in an integral bottom wall, said container body being formed from at least two laminated sheets of material, said container body being of a definite and stable shape and volume at room temperature and atmospheric pressure, a first of said sheets forming an outer wall of the container body and a second of said sheets forming an inner wall of the container body, the improvement comprising; constructing said first sheet from metallic material and said second sheet from polymeric plastic material whereby the relative impermeability of the metallic material protects the plastic from oxygen permeation at temperatures in excess of the melting-temperature range of the plastic material, the plastic material having a predetermined melting-temperature range, said laminated container body maintaining its integrity and dimensional stability at temperatures substantially in excess of the melting-temperature range of said plastic material, the thickness of the first sheet is between the range of .0003–.015 inch and the thickness of the second sheet is between the range of .002–.02 inch.

3. In a laminated container of the type including a container body terminating in an integral bottom wall, said container body being formed from a pair of first sheets of material forming inner and outer walls of the container body and a second sheet forming an intermediate wall of the container body between the inner and outer walls thereof, said container body being of a definite and stable shape and volume at room temperature and atmospheric pressure, the improvement comprising: constructing said pair of first sheets from polymeric plastic material and said second sheet from metalic material whereby the dimensional stability of the container body is maintained at temperatures at and in excess of the melting-temperature range of the plastic material, the plastic material having a predetermined melting-temperature range, and said laminated container body maintaining its integrity and dimensional stability at temperatures substantially in excess of the melting-temperature range of said plastic material.

4. The laminated container as defined in claim 3 wherein the thickness of each of the pair of first sheets is between the range of .002–.02 inch and the thickness of the second sheet is in the range of .0003–.015 inch.

5. In a laminated container of the type including a container body terminating in an integral bottom wall, said container body being formed from a pair of first sheets of material forming inner and outer walls of the container body and a second sheet forming an intermediate wall of the container body between the inner and outer walls thereof, said container body being of a definite and stable shape and volume at room temperature and atmospheric pressure, the improvement comprising constructing said pair of first sheets from metallic material and said second sheet from polymeric plastic material whereby the relative impermeability of the metallic material protects the plastic material from oxygen permeation and cooperates with the plastic material to maintain the dimensional stability of the container body, the plastic material having a predetermined melting-temperature range, said laminated container body maintaining its integrity and dimensional stability at temperatures substantially in excess of the melting-temperature range of said plastic material, the thickness of each of the pair of first sheets is between the range of 0.0005–.002 inch and the thickness of the second sheet in the range of .005–.01 inch.

6. In a laminated container of the type including a container body terminating in an integral bottom wall, said container body being formed from at least two laminated sheets of material drawn at room temperature, said container body being of a definite and stable shape and volume at room temperature and atmospheric pressure, the improvent comprising constructing one of said sheets from polymeric plastic material and the other of said sheets from metallic material, the plastic material having a predetermined melting-temperature range, said laminated container body maintaining its integrity and dimensional stability at temperatures substantially in excess of the melting-temperature range of said plastic material, said one sheet having a thickness substantially in the range of .005 to .01 inch and said other sheet having a thickness substantially in the range of .0005–.001 inch whereby the relative impermeability of the metallic material protects the plastic material from oxygen permeation and cooperates with the plastic material to maintain the dimensional stability of the container body.

7. The laminated container as defined in claim 6 wherein the plastic material is polyethylene and the metallic material is aluminum foil.

8. A package comprising a container and a media in said container, said media being a liquid, said container comprising a container body having an integral bottom wall, said container body being formed from at least two laminated sheets of material, the first of said sheets being constructed from polymeric plastic material having a predetermined melting-temperature range, the second of said sheets being constructed from metallic material, said container body being of a predetermined size, shape and volume, the laminated container body maintaining its size, shape and volume at temperatures substantially in excess of the melting temperature range of the plastic material, the thickness of the plastic material being within the range of .005–.01 inch and the thickness of the metallic material being within the range of .0005–.015 inch.

References Cited by the Examiner

UNITED STATES PATENTS

| | | |
|---|---|---|
| 2,771,668 | 11/1956 | Lindsey. |
| 2,902,396 | 9/1959 | Reynolds _____ 229—3.5 |
| 2,951,765 | 9/1960 | Robson. |
| 2,956,915 | 10/1960 | Korn et al. _____ 220—63 X |
| 3,143,364 | 8/1964 | Klein _____ 161—217 |

LOUIS G. MANCENE, *Primary Examiner.*

THERON E. CONDON, *Examiner.*

G. T. HALL, *Assistant Examiner.*